United States Patent [19]
Apsit et al.

[11] 3,967,145
[45] June 29, 1976

[54] CONTACTLESS SYNCHRONOUS ELECTRIC MACHINE

[76] Inventors: Voldemar Voldemarovich Apsit, ulitsa V. Latsisa, 2a, kv. 21; Zigurd Karlovich Sika, Vaidavas, 27, kv. 40; Daniel Petrovich Kikust, ulitsa Bikernieku, 81, kv. 34, all of Riga, U.S.S.R.

[22] Filed: June 24, 1974

[21] Appl. No.: 482,598

[52] U.S. Cl. .................................................. 310/52
[51] Int. Cl.² .......................................... H02K 9/00
[58] Field of Search ............... 310/10, 40, 52, 263, 310/157, 162, 163, 164, 49, 67; 322/28

[56] References Cited
UNITED STATES PATENTS

| | | | |
|---|---|---|---|
| 3,215,878 | 11/1965 | Woodward | 310/263 |
| 3,242,418 | 3/1966 | Mela | 310/10 |
| 3,405,290 | 10/1968 | Halas | 310/10 |
| 3,648,082 | 3/1972 | Mac Nab | 310/10 |
| 3,657,580 | 4/1972 | Doyle | 310/10 |
| 3,764,835 | 10/1973 | Luck | 310/52 |
| 3,781,578 | 12/1973 | Smith | 310/52 |

OTHER PUBLICATIONS
T917,066, 12/73, Mole, 310/100.

*Primary Examiner*—R. Skudy
*Attorney, Agent, or Firm*—Haseltine, Lake & Waters

[57] ABSTRACT

A contactless synchronous electric machine comprises a stator carrying an armature winding, a field winding and a rotor with claw-shaped pole systems coaxially surrounding the stator with the armature winding. The armature winding and the field winding are made from a superconducting material and secured within a cryostat with liquid helium blowing round said windings. The cryostat is axially disposed within the rotor and is attached to a housing. The assembly including the rotor, cryostat and stator is vertically arranged in the housing and the rotor shaft extends through an opening in the bottom of the housing.

5 Claims, 4 Drawing Figures

CONTACTLESS SYNCHRONOUS ELECTRIC MACHINE

The present invention relates to generation of electric energy, and more particularly to contactless synchronous generators for stationary and mobile power stations. At present, contactless synchronous generators fitted with claw-shaped pole systems find application in relatively low-power plants. These machines have no slide contacts in the electric circuits and are noted for their simple design and high reliability. A contactless synchronous machine provided with claw-shaped poles and an internal magnetic circuit is distinguished for its minimum weight.

Such a machine comprises a stator having a fixed armature winding and a rotor concentrically arranged within the stator. The rotor is made in the form of a hollow cylinder and consists of two claw-shaped pole systems attached together by a nonmagnetic material, such as aluminium, copper, or plastic.

With its one end, the rotor is fitted onto a shaft to jointly rotate with the stator. Introduced into the inner space of the hollow rotor through its opposite end is a fixed central core of a magnetic circuit, having a field winding made in the form of a circular coil rigidly attached thereto in an annular groove and encircling the central core in the mid-plane of the rotor. The central core is made of steel and is coaxially disposed within the rotor. The stator and rotor are separated by a main air gap; two auxiliary air gaps separating the central core from the rotor are provided at the opposite ends of the field winding. The machine is fitted into a housing made of a nonmagnetic material, such as aluminium, having attached thereto the stator, the central core and bearings which support the rotatable shaft of the machine.

Though simple in design and dependable in operation, this machine has the disadvantage of being too long and its magnetic circuit being too heavy. The required cross-section and weight of the magnetic circuit increase with the power of the machine; therefore, a medium and high-power contactless synchronous machine with claw-shaped poles and an internal magnetic circuit proves to be considerably heavier than a conventional salient-pole machine of the same power output; furthermore, the efficiency of a contactless machine is lower due to increased electrical losses in the massive parts of the steel magnetic circuit. The above disadvantages render the use of contactless synchronous machines with claw-shaped poles as electric generators of moderate or high power impractical.

As is well known, the weight of an electric machine can be drastically reduced and its efficiency increased by making the machine windings from a superconducting winding wire. The permissible current density in a superconducting wire is hundreds of times higher than that in a conventional winding wire used in electric machines. This makes it possible to provide such a powerful excitation system of an electric machine that the use of a steel magnetic circuit as a path for a magnetic flux traveling to the armature winding becomes unnecessary. Besides, the machine consumes by far less excitation energy than a conventional synchronous machine with the result that the efficiency of a synchronous machine constructed with superconducting windings increases. Known in the art is a synchronous electric machine with stator and rotor superconducting windings, U.S. Pat. No. 3,005,117.

This generator comprises a rotor with a field winding, arranged in coaxial and close-spaced relation with a stator internally thereof, the stator having an armature winding, the field and armature windings being made of superconducting material. The generator rotor has a shaft movably supported for rotation in bearings and provided with a number of riblike spokes. Tightly wound around the spokes are coils of the field winding secured by means of an annular band made of a low-temperature alloy, such as 4 Al-3Mo-IV. The stator includes a cylindrically shaped frame with inner longitudinal slots receiving the armature winding. With its ribs the stator housing rests on and is enclosed within a magnetic flux shield made from a superconducting sheet material. The flux shield, in turn, bears with its ribs against the machine housing covered by suitable cryogenic type thermal insulation. The superconducting field and armature windings are cooled and kept at temperatures below the critical temperature of the superconducting material from which said windings are made by gaseous helium of a sufficiently low temperature. From a helium liquifier, the refrigerant is introduced into the chamber between the housing and the sield through a conduit that passes through the cryogenic insulation. Flowing through the chamber to the left (as per drawing), the refrigerant then changes its direction to the right and enters the interior of the shield through a perforated shield end. The flow is subsequently divided into three concentric streams which go through the passages in the rotor between the field winding coils and the shaft, the gap between the stator and rotor and the space between the outer surface of the rotor housing and the shield. Thereafter, the refrigerent converges into a single flow which returns to the helium liquifier through a conduit coaxially surrounding the refrigerant supply pipe. Along with the obvious advantages, this generator has some limitations, namely, an increased heat influx into the cooled zone, seals in the openings through which the shaft protrudes outward from the generator housing, required against a leak of the refrigerant from the generator, complicating thereby the generator design and decreasing its operational reliability; and slide contacts in the rotor electric circuit, which also impair stable operation of the generator.

The most serious of the disadvantages inherent in this generator is the increased heat inflow, caused by external and internal heat sources, that substantially reduces the overall efficiency of the generator helium liquifier arrangement. The principal external heat inflow source is the generator shaft which, from considerations of mechanical strength, has to be made rather massive as it transmits all of the generator's power to the rotor.

The major inner source of heat liberation is friction developed as a result of the rotor's rotation in the refrigerant.

Another source of internal heat release are eddy currents induced in metal parts of the rotor and stator by an alternating magnetic field. To ensure against eddy current heating, it has been suggested that the rotor spokes and the band should be made as a stack of thin metal sheets insulated from one another.

Such a technique reduces but partially eddy current heating.

It is an object of the present invention to substantially increase the field coil magnetizing force in a contactless synchronous machine with claw-shaped poles, avoiding thereby the use of a steel magnetic circuit which serves to deliver a magnetic flux to an armature winding.

Another object of the invention is to decrease external heat influx to machine elements.

Still another object is to reduce internal heat release caused by friction as a result of rotation of the machine parts in the refrigerant.

A more general object is to provide a highly efficient, reliable, high-power contactless machine with claw-shaped poles and superconducting field and armature windings, having a diminished weight and size and increased efficiency.

Such a machine can be used as a generator at high-power plants, both stationary (electric power stations) and mobile (large sea-going vessels, air- and spacecraft).

These and other objects are achieved in a contactless synchronous electric machine comprising a stator carrying an armature winding and a field winding, each made of a superconducting material, and a rotor provided with claw-shaped pole systems and fitted on a shaft for joint rotation with the stator, which, according to the present invention, is characterized by that the armature winding and the field winding are rigidly secured in a cryostat which is stationary and coaxially supported within the rotor with liquid helium flowing round said windings.

The contactless synchronous electric machine may comprise a housing with the cryostat being rigidly secured therein and accommodating the armature and field windings, the cryostat bottom being fitted in a bearing having a fixed inner race and an outer race fitted in the end face of the rotor shaft which passes through an opening in the base of the housing and is adapted to rotate freely.

It is advisable to make the walls of the cryostat containers, at least those portions thereof which are confined within the gap between the stator and the rotor, from an insulating material.

It is desirable to dispose the armature winding on the outer surface of a cylindrical core which may be attached to a tube coaxially extending within the cryostat and fastened to the cryostat cover, and to make this core from a material which acquires ferromagnetic properties at the temperature of liquid helium, in the form of a stack of thin sheets electrically insulated from one another.

Besides, the field winding may be made of at least two ring coils attached to the ends of the armature winding on the tube within the cryostat.

The present invention will become more apparent from the following detailed invention will become more apparent from the following detailed description thereof with reference to the accompanying drawings, in which:

FIGS. 1 and 1' are, respectively, the upper and lower halves, taken in is a longitudinal view, in section, of a contactless synchronous electric machine, in accordance with the present invention;

Figure 1:
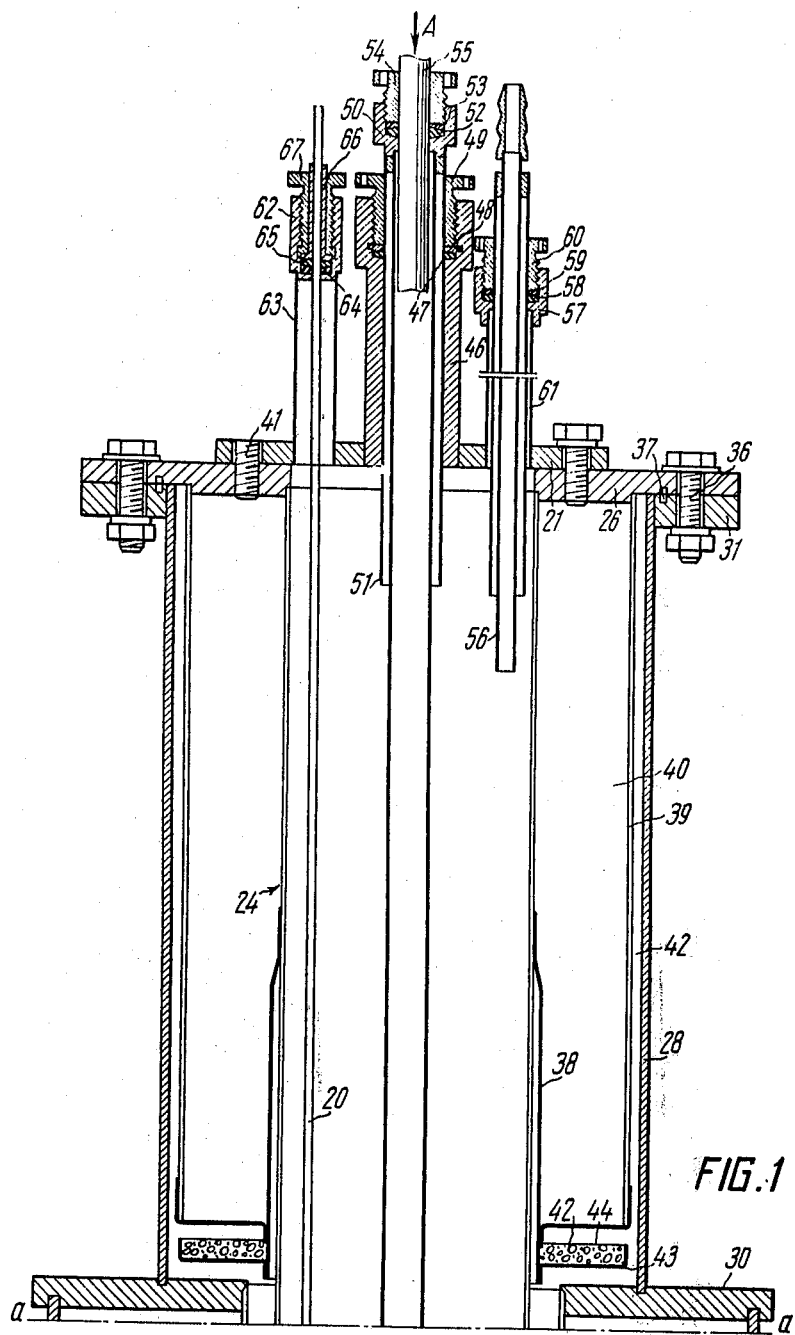
Figure 1:
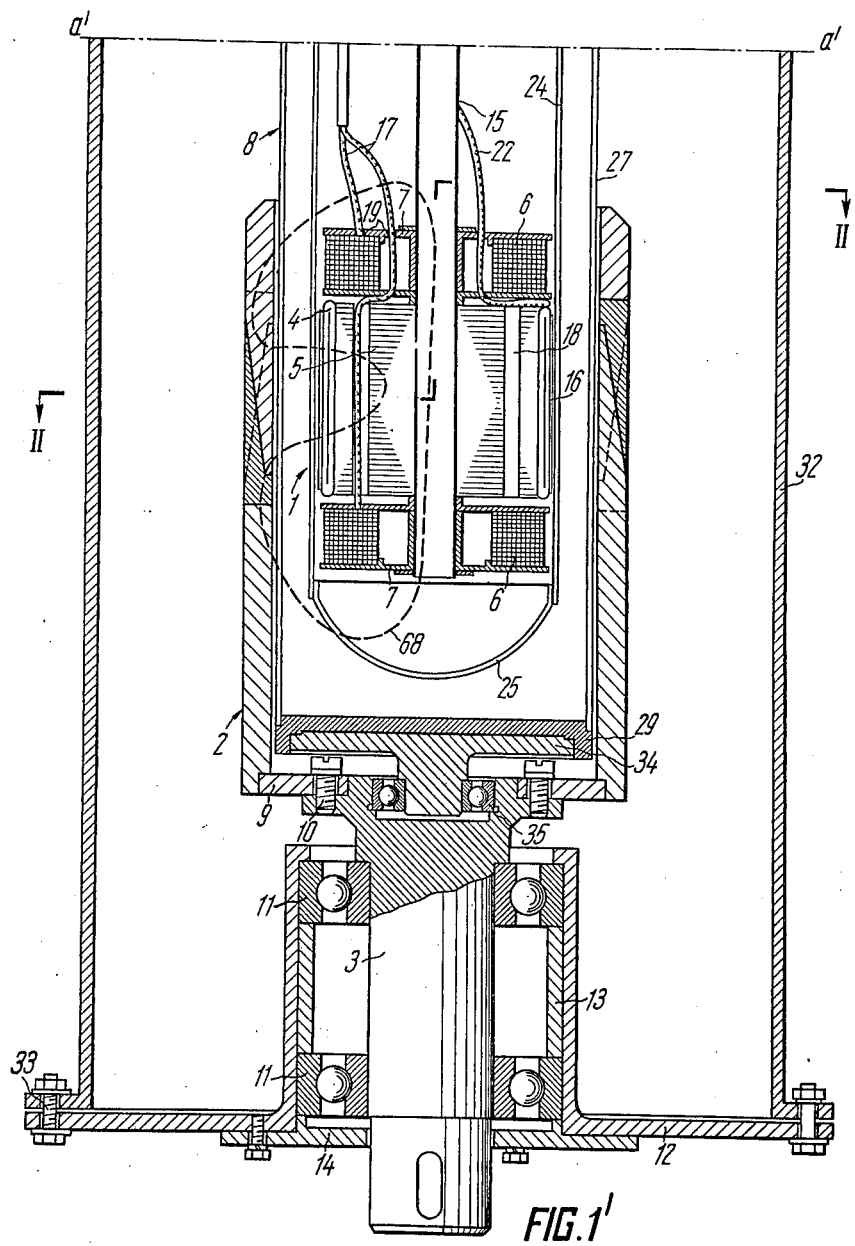
Figure 3:
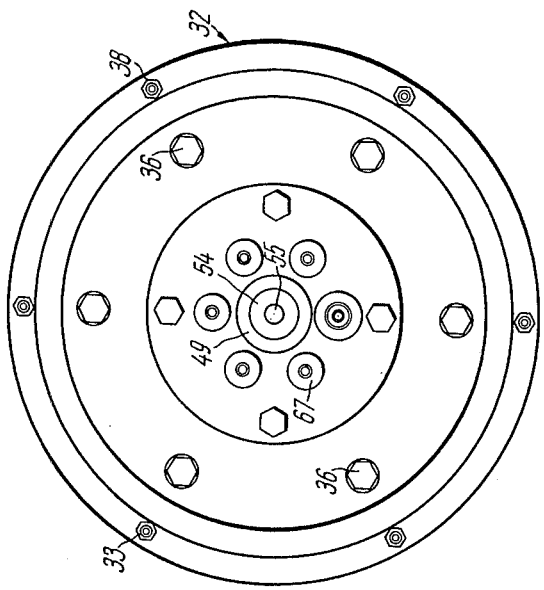
FIG. 3 is an end view of the electric machine taken in the direction as indicated by arrow A in FIG. I.

The contactless synchronous electric machine constructed in accordance with the present invention comprises a stator I, a rotor 2 rigidly secured, on a rotatable shaft 3 and coaxially enclosing the stator I with a narrow air gap.

The stator I carries an armature winding 4 disposed on the other surface of a cylindrically shaped core 5, and a field winding 6 made up of two spared coils, respectively one end being secured by means of holders 7 at the opposite ends of the armature winding 4 without electrical connection to the latter.

The stator I is housed in a cryostat 8 which coaxially surrounds it in a close-spaced relation. The rotor 2 consists of two claw-shaped pole systems bonded together by a filling of a nonmagnetic material, such as aluminium, copper plastic. The rotor 2 is set up vertically and coaxially encircles both the stator I and cryostat 8 which comprises a dual Dewar flask with vacuum heat insulation.

As the cryostat 8 coaxially encloses the machine stator I and the rotor 2 coaxially encloses the cryostat 8, the walls of the latter are disposed in the air gap between the stator I and rotor 2. For the air gap to be relatively small, the cryostat walls are made as thin as possible.

Welded to the lower pole system of the rotor 2 is a ringshaped plate 9.

The plate 9 of the rotor 2 is bolted to the shaft 3 at 10. The shaft 3 is rotatably mounted in bearings II, the latter being secured in a bearing housing 12. A distance piece 13 and a cover 14 serve to fix the bearings II in position.

The cylindrical core 5 of the stator I is made of an insulating material, for example, glass-fibre-reinforced plastic, or fabricated in the form of a stack of electrically insulated thin ferromagnetic sheets of electrically metal, such as steel, holmium, or dysprosium.

The cylindrical core 5 of the stator I and holders 7 of the field winding 6 are fastened to a tube 15.

The wire of the armature winding 4 and field winding 6 is made of a superconducting material, such as Nb-Zr;Nb-Ti; $Nb_3Ga$, and other alloys, the superconducting wire for the armature winding being essentially characterized by minimum losses due to alternating current. Such conductors are now available; they are made from extremely thin wires of the abovementioned material.

The armature winding 4 is made up of flat coils in a conventional three-phase connection typical of electric machine armature windings, which coils are attached to the cylindrical surface of the core 5 by means of a band 16 made of glass tape or any other suitable material.

The field winding 6 is made up of two ring coils which are connected in parallel by means of superconducting lead-outs 17 so as to enable a unidirectional magnetizing force to be produced by the coils. The lead-outs 17 pass through openings 18 in the core 5 and openings 19 in the holders 7. These openings also serve to improve cooling of the stator I.

Thus, the winding 6 has two lead-outs 17, each being soldered to a copper tube 20 which passes through a cover 21 of the cryostat 8 and is appropriately insulated therefrom.

The three-phase armature winding 4 has three superconducting lead-outs 22 appropriately passed through the openings 19 of the holders 7 and soldered to copper tubes (not shown) passing through the cover 21 of the cryostat 8 and insulated therefrom.

The cryostat 8 is intended to cool the stator I to the temperature of liquid helium, i.e. to 4.2°K. The cryostat 8 comprises an inner container and an outer container which are vacuum-insulated from each other and have an intermediate heat shield, use forth is purpose being made of liquid nitrogen.

The inner container of the cryostat 8 includes a cylinder 24, a hemispherical bottom 25 are made from glass-fibre-reinforced plastic to ensure against possible occurrence of eddy currents as the inner container walls are permeated with an alternating magnetic flux, whereby heating of said walls is precluded.

The outer container of the cryostat 8 includes two cylinders 27 and 28 different in diameter, a flat bottom 29, an intermediate ring plate 30 and a flange 31.

The cylinder 27 is made from glass-fibre-reinforced plastic. The other components of the outer cryostat container may be fabricated from any suitable constructional material, such as stainless steel, glass-fibre-reinforced plastic, etc.

The intermediate ring plate 30 is welded to a housing 32 which terminates in a flange supporting the bearing housing 12 fastened thereto by means of bolts 33.

The bottom 29 of the outer container of the cryostat 8 rests on a stationary support 34 fixed by a bearing 35 in the end face of the shaft 3. The inner and outer cryostat containers are bolted together at 36.

The flange 31 has an annular groove with a vacuum rubber washer 37 inserted thereinto which seals the joint between the inner and outer cryostat containers. The chamber formed between the walls of the inner and outer cryostat containers accommodates a cylindrically shaped copper shield 38 surrounding the inner container of the cryostat 8. Inserted between the copper shield 38 and flange 26 of the inner cryostat container is a partition 39 fabricated from stainless steel in the form of a cylinder with a circular bottom. The partition 39 arranged in the space between the inner and outer cryostat containers confines an annulus 40, filled with liquid nitrogen through a part 41, and an evacuated space 42.

Liquid nitrogen in the annulus 40 serves as a heat screen against an inflow of external heat to the inner container through the side walls of the cryostat 8, which would otherwise occur as a result of heat transfer through the heat conducting walls of the inner container. The inner container of the cryostat 8 is filled with liquid helium and the machine stator I is completely immersed in liquid helium.

The armature winding 4' and field winding 6 fitted on the stator I are exposed to liquid helium flowing round them and cooled thereby to the boiling point of liquid helium at normal pressure, i.e. to 4–2°K. The openings 18 in the core 5 and openings 19 in the holders 7 serve to improve the convection of liquid helium for proper cooling of the core 5, armature winding 4 and field winding 6. The inner cryostat container is so arranged internally of the outer container that their walls do not touch.

To ensure heat insulation, the space 42 between the walls of these containers is highly evacuated.

To improve vacuum, use is made of activated birch charcoal 43 functioning as an adsorption pump. This activated charcoal is placed on a ring shelf 44 soldered to the copper shield 38, and is covered over by a copper mesh 45. The presence of charcoal permits the evacuation of the inner space 42 only to $10^{-1} + 10^{-2}$ mm Hg. On filling the annulus 40 with liquid nitrogen, vacuum reaches $10^{-6} - 10^{-8}$ mm Hg. Liquid helium prevents influx of heat into the cooled zone of the machine, i.e. serves as an outer heat barrier.

Coating the outer surface of the inner container of the cryostat 8 with silver or aluminium additionally decreases heat flux due to thermal radiation into the cooled zone of the machine.

To minimize heat influx due to heat transfer through the walls of the cryostat 8, it is advisable that the walls of the inner container, central tube 15 and partition 39 should be sufficiently thin, this being determined by the mechanical strength of the selected material, and the cryostat 8 should be selected sufficiently.

The top of the inner container of the cryostat 8 is closed by the cover 21. Welded to the central portion of the cover 21 is a bushing 46 which is intended for the central tube 15 to be fitted therein, the latter being sealed by a gasket 47 made from vacuum rubber, a thrust ring 48 and a nut 49. As the nut 48 is tightened, the gasket 47 is compressed and fixes the central tube 15. Such fastening enables accurately adjustable mounting of the core 5, stator I and field winding coils relative to the claw-shaped pole systems of the rotor 2.

A housing 50 of the abovefastening members is soldered to the upper end of the central tube 15 which is loosely fitted into a thin-walled tube 51 of stainless steel. The tube 51 reduces the heat influx from the cover 20 of cryostat 8 to the central tube 15. A gasket 52, a ring 53 and a nut 54 are accommodated in the housing 50 and ensure tight sealing of a helium supply pipe 55 through whichl liquid helium is introduced into the cryostat 8 from a tank or a liquefier.

The evaporated gaseous helium is removed through an outlet 56 made in the form of a twin conduit for minimizing heat influx. The conduit 56 is connected to the cryostat by means of a fastening assembly consisting of a housing 57, a gasket 58, a ring 59 and a nut 60. To minimize heat influx, the housing 57 is connected to the cover 21 of the cryostat 8 through a thin-walled tube 61 of stainless steel.

Figure 2:
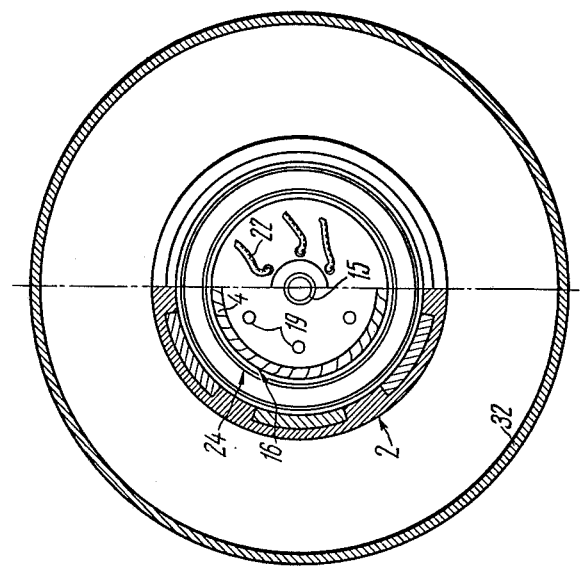
FIG. 2 is a section view taken along line II—II of FIG. 1.

Symmetrically arranged on the cryostat cover are five identical fastening assemblies for the copper tubes 20 enclosing the lead-outs of the machine windings (three leadouts of the armature winding 4 and two lead-outs of the field winding 6; see (FIG. 2). The fastening assembly for the copper tube 20 with a lead-out of the field winding 6 is shown in longitudinal section in FIG. 1. To reduce heat influx, a housing 62 of this fastening assembly is attached to the cover 21 of the cryostat 8 through a thin-walled tube 63 of stainless steel. Accommodated in the housing 62 are a washer 64, a gasket 65 of vacuum rubber, a tube 66 with a shoulder and a nut 67. The washer 64 and tube 66 are made from an insulating material (textolite, vinylite, etc.). The tube 66 is fitted over the copper tube 20 and insulates the latter from the nut 67. With its bottom end the nut 67 bears against the shoulder of the tube 66. As the nut 67 is tightened, the shoulder of the tube 66 compresses the rubber gasket 65 and fixes the copper tube 20.

With the machine operating, the helium in the inner container of the cryostat 8 is maintained at a level which is 20 to 30 mm above the upper coil of the field winding 6 and the level of liquid nitrogen in the annulus 40 ks kept 40 to 50 mm above the point of attachment of the copper shield 38 to the inner container of cryostat 8. In addition to the liquid nitrogen port 41, the annulus 40 has a nitrogen vapour outlet port (not shown).

To ensure continuous operation of the machine, it is advisable to include the inner container of the cryostat 8 in a closed loop with a helium liquifier by directly connecting the liquid helium outlet pipe and supply pipe 55 to the helium liquifier.

The field winding 6 energized with direct current develops an axial magnetizing force that produces an axial magnetic flux in the central portion of the stator 1. The flux closes through the pole systems around the stator 1 partially permeating the armature winding 4; this portion of the flux is useful and that portion of the flux which closes directly between the opposite-polarity pole systems bypassing the armature winding 4 is a stray flux. The path of the useful flux is shown in FIG. 1 by arrow 68.

An increase in the useful flux is most desirable for it makes it possible to obtain the same output voltage with a reduced numer of turns of the armature winding 5 and, therefore, diminish the weight and size of the machine. To increase the useful flux, its permeance, compared to that of the dispersion flux, should also be increased. For this purpose, the core 5 of stator I should preferably be made from ferromagnetic material. Furthermore, in order to reduce heat release due to eddy currents in the core 5, it should be fabricated in the form of a stack of thin electrically insulated sheets. Since the core 5 is completely submerged in liquid helium and its temperature is close to 4.2°K, it is expedient to use rare-earth metals for its fabrication, such as dysprosium, holmium, which at the temperature of liquid helium become good ferromagnets with higher magnetic permeability than that of steel. Dysprosium and holmium, as is known, become saturated at induction in the neighbourhood of 4 teslas. By fabricating the core 5 as a stack of thin sheets made from the above-mentioned metals, it is possible to reach an induction in the gap between the stator I and rotor 2 in the order of 2 teslas.

To augment still further the useful flux, a minimum gap should be provided between the stator I and rotor 2. For this reason, the heat screen is not interposed between the inner and outer cryostat container walls passing through this gap. The required heat insulation of this portion of the cryostat is effected solely by high vacuum in the space 42 between the inner and outer containers of the cryostat 8. The annulus 40 filled in with liquid nitrogen provides for heat screening only in the upper portion of the cryostat 8.

As can be seen from the foregoing description of the present invention, a highly effective, simple and reliable contactless synchronous machine with the claw-shaped poles and superconducting field and armature-windings has been provided.

The magnetizing force of the field winding so increases at minimum consumption of the machine energy input through the use of a superconducting field winding, that this enables one to almost completely abandon the employment of a ferromagnetic magnetic circuit preserving only claw-shaped pole systems made of steel and, in a number of cases, a stator core made in the form of a cylinder.

The weight and size of the machine are considerably reduced and its efficiency increased due to a decreased Joule heat effect in the field winding 6 and armature winding 4 and also decreased losses in the magnetic-circuit steel.

Rigid fitting of the field winding 6 and armature winding 5 in the cryostat 8 and disposing the steel winding-less rotor 2 outside the cryostat 8 eliminate a major source of external heat influx; i.e. the massive shaft penetrating inside the cryostat, and a major internal heat influx source, namely, friction as a result of rotor rotation in the refrigerant. Furthermore, the amount of liquid helium required for cooling the superconducting windings is reduced, thereby adding to the efficiency of an installation incorporating the synchronous generator of the present invention and a helium liquifier.

An additional source of heat liberation inside the cryostat caused by eddy currents is also eliminated due to the fact that the walls of the cryostat 8 are made from a dielectric.

The stator I is compact and fully submerged in liquid helium. The cryostat is simple in design, free of rotating parts and, therefore, of complicated sealing devices that are otherwise needed for rotating parts extending from the cryostat.

The reliability of the machine is further enhanced due to the absence of slide contacts in the electric circuitry of the machine.

It should be noted that the cooling system of the contactless synchronous machine is more effective than that in the prior art synchronous machines with superconducting windings.

In the known electric machines with superconducting field and armature windings, the rotor rotates inside the cryostat, or a separate rotary cryostat is provided for a rotor and a stationary one for a stator. With the rotor rotating within the cryostat, the massive shaft capable of transmitting the entire power to the rotor should extend inside the cooled zone of the machine. Such a shaft is highly heat conducting. An additional heat source inside the cryostat may be due to the friction of the rotor in the refrigerant (liquid helium or cold helium vapours). From design considerations, it is also difficult to accomplish appropriate sealing required at the ends of the shaft.

Helium churned in the cryostat during its rotation is an additional heat source within the rotating cryostat. An uninterrupted supply of liquid helium through a hollow shaft into the rotary cryostat is a complex engineering problem, too.

The contactless synchronous electric machine of the present invention has no such additional sources of heat influx and release within the cryostat. It should be emphasized that for absorption of one watt of heat inside the cryostat, the liquefier consumes approximately one kilowatt of electric energy, therefore elimination of heat release sources inside the cryostat enables the machine efficiency to be significantly increased.

The machine according to the present invention preserves principal advantages of the machines with superconducting windings of the inductor and armature and has additional advantages: simple construction and increased efficiency resulting from the reduction of heat liberation within the cryostat. Still another advantage of the machine consists in that it is contactless i.e. it has no slide contacts in the circuit path through which electric power is supplied to the machine windings.

The above-mentioned embodiment of the present invention relates only to a particular synchronous generator, yet it can be equally applied to electric motors as is apparent to those skilled in the art.

While the invention has been described hereinabove in terms of a presently preferred embodiment thereof, the invention itself is not limited thereto, but rather comprehends all modifications of and departures from that embodiment properly falling within the scope and spirit of the appended claims.

What is claimed is:

1. A contactless synchronous electric machine comprising: a stator carrying an armature winding made of a superconducting material; a rotor provided with claw-shaped pole systems coaxially encasing the stator; said rotor being attached with one of its ends to a shaft transmitting rotary motion thereto; a field winding made from a superconducting material being connected to said stator; a cryostat immovably disposed within the rotor pole systems and coaxially encircling the stator; said armature winding and field winding being secured inside the cryostat.

2. A contactless synchronous electric machine comprising: a housing; a stator carrying an armature winding made from a superconducting material; a rotor provided with claw-shaped pole systems coaxially encircling said stator; a rotor shaft adapted to rotate freely and being drivingly connected to said rotor; a vertically positioned assembly including of the stator and the rotor; a field winding made of a superconducting material being connected to said stator; a cryostat immovably positioned within the rotor pole systems and coaxially encircling the stator; said cryostat being rigidly attached to said housing.

3. A contactless synchronous electric machine as claimed in claim 2, the cryostat having containers including portions thereof which are confined within the gap between the stator and the rotor, said wall portions being made from an insulating material.

4. A contactless synchronous electric machine as claimed in claim 2, comprising: a tube coaxially extending within said cryostat; a cylindrical stator core; said armature winding arranged on the outer surface of said core; the core with the armature winding being fastened on said tube within the cryostat; said field winding being made up of at least two ring coils fastened on said tube at the ends of said cylindrical core.

5. A contactless synchronous electric machine as claimed in claim 4, wherein the core of the armature winding is made of a material which acquires ferromagnetic properties at the temperature of liquid helium, in the form of a stack of thin sheets electrically insulated from one another.

* * * * *